G. W. WARREN.
Grain Drill.
No. 45,775. Patented Jan. 3, 1865.
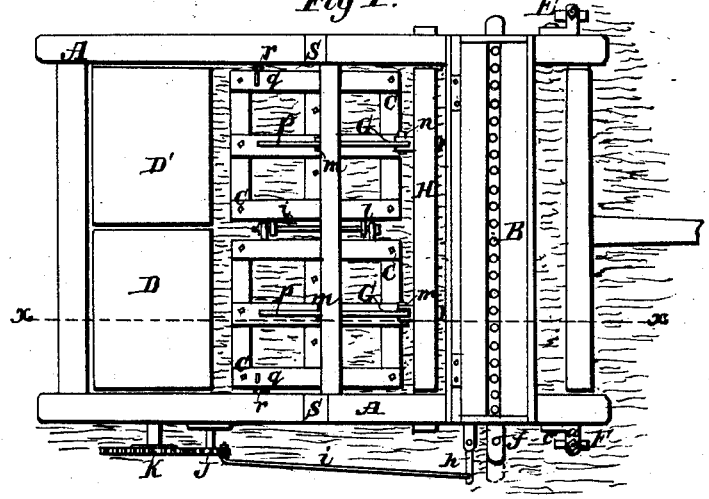
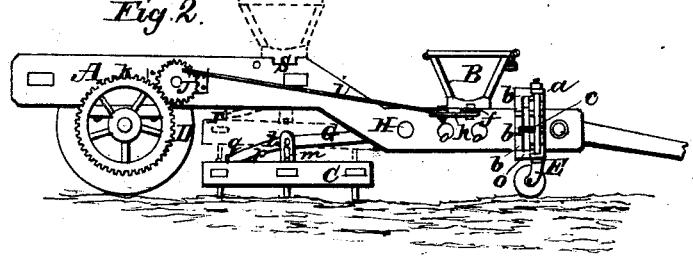
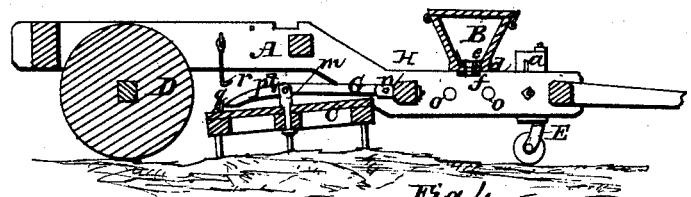
Witnesses.
Jay Hyatt
H. Jerross
Inventor:
Geo. W. Warren
By J. Fenser & Co
Attys.

UNITED STATES PATENT OFFICE.

GEORGE W. WARREN, OF OSSIAN, NEW YORK.

IMPROVEMENT IN BROADCAST-SEEDING MACHINES.

Specification forming part of Letters Patent No. 45,775, dated January 3, 1865.

*To all whom it may concern:*

Be it known that I, GEORGE W. WARREN, of Ossian, in the county of Livingston and State of New York, have invented a certain new and useful Improvement in Broadcast-Seeding Machines; and I do hereby declare that the following is a full and exact description thereof, reference being had to the accompanying drawings, making part of this specification.

Figure 1 is a plan of my improved machine; Fig. 2, a side elevation; Fig. 3, a longitudinal vertical section in the plane of line $x\ x$, Fig. 1; Fig. 4, a vertical transverse section of the seed-hopper; Fig. 5, a longitudinal vertical section of a portion of the slides and bottom of the seed-hopper.

Like letters of reference indicate corresponding parts in all the figures.

My improved machine is of that class where the seed is distributed from a long box or hopper and a drag-harrow is employed to cover it and a roller to press the soil down.

My invention has more special reference to the construction, arrangement, and operation of the harrow in connection with the other parts.

As represented in the drawings, a suitable frame, A, is employed, having situated across in front a hopper, B, and in the rear of this a drag-harrow, C, and still behind this, at the rear of the frame, a heavy roller, D D', of peculiar construction. The front end of the frame is supported by caster-wheels E E, that are adjustable higher or lower by any suitable means, that represented being a bearing, $a$, having horizontal grooves $b\ b$, in any of which fits a clamp-head, $c$, passing through the side piece of the frame, and having a nut screwing on the opposite end.

The construction of the hopper B is similar to others already in use. On its bottom $d$ is situated a movable longitudinal slide, $e$, and beneath it is another slide, $f$. These slides, together with the bottom of the hopper, are provided with a set of discharge-holes, $g\ g$. The upper slide, $e$, is for the purpose of gaging or limiting the amount of seed that is sown—that is, by moving it so that the holes $g$ coincide the maximum amount will be sown, or by moving it so as to nearly cut off the connection of the holes in the respective parts the minimum amount will be sown. The lower slide, $f$, is intended to distribute the seed that passes through the holes by its vibrations. These vibrations may be produced by any desirable means, that represented in the drawings being a pivoted elbow, $h$, connected by means of a connecting-rod, $i$, with a pinion, $j$, that receives its motion by gearing with a cog-wheel, $k$, on the shaft of the roller D D'.

The harrow C is made up of two similar sections or halves united in the middle by an ordinary joint, $l$, that allows either section to rise or fall independently of the other, as shown most clearly in Fig. 1. To the center of each section of the harrow is secured a standard, $m$, and to this standard is jointed, by means of adjusting-holes $t\ t$, a bar, G, that extends forward longitudinally of the machine, and is hinged, as represented at $n$, to a shaft, H, that has its bearing in any one of a set of adjusting-holes, $o\ o$, in the frame, by which means the harrow may be adjusted forward or back, as may be necessary. The bar also extends back, forming an arm, $p$, in the rear of the standard $m$, and the extremity of this arm rests against the top of the harrow when the latter is in a level position or slightly inclined forward, as indicated in Fig. 2; but the harrow is allowed to incline in the opposite direction, as shown in Fig. 3, in order to pass over inclinations of the ground without plowing deeply through. This arrangement of the arm $p$ of the bar, in combination with the harrow, is of the greatest importance, for were it not for it, if the forward end of the harrow should strike an obstruction or should suddenly pass into a deep hollow or ditch, the harrow would tip over forward, bottom upward. It is desirable that the draft should be applied to the harrow centrally instead of in front, not only for the purpose of lessening the power necessary to be applied, but also to give a more regular and uniform action to the device. Furthermore, the arm $p$, by resting against the rear of the harrow, gives the latter more steadiness, and thereby insures a more perfect pulverization of the soil. I am not aware that this device has ever before been known, and such I claim.

To the rear of each section of the harrow, at the proper position, is secured a staple or eye, $q$, into which catches a hook, $r$, of the frame when the harrow is raised, as shown by the red lines in Fig. 2. The harrow is thus suspended away from the ground, so that the machine may be transported, when desired, without difficulty.

By adjusting the harrow forward in the front holes, o o, and by adjusting the hopper back on the frame to the position marked s, as indicated by red lines, Fig. 2, it is manifest that the seed may be sown in the rear of the harrow and covered only by the roller D D'. This may be necessary in sowing some kinds of seed and in some conditions of the soil.

The roller is made up of two or more sections, as may be desirable or necessary. One of these sections, D, is secured firmly to its shaft, so as to give motion to the cog-wheel k, and thereby drive the seeding device; but the other section or sections, D', fit loosely on the shaft and turn independently of it. There are several advantages in this arrangement: First, I am enabled to turn short corners or entirely around without difficulty, for, while one section acts, as it were, as a pivot, the other can turn around it, like a wheel, or even go backward in the opposite direction, thus lessening the friction and insuring a better action. Where the roller is made entire the friction in turning is very great, as one end must slide around without rolling; second, I am enabled to pass over inequalities of the ground better, for it is frequently the case that some one portion of the roller has a tendency to turn faster than the others, owing to the inequality. For instance, in passing over a small hillock or a stone that part of the roller that comes in contact with it would have a tendency to turn faster than the other portions. But while I secure these advantages I do not claim simply making the roller in sections, but making it in sections in such a manner that one section is fast to the shaft while the others turn independently.

Under some circumstances it may be necessary to dispense with the roller D D'. In this case the same is removed, and the rear end of the frame is mounted on wheels in any desirable manner.

What I claim as my invention, and desire to secure by Letters Patent, is—

The jointed bar G, provided with the arm p, in combination with the harrow C, standard m, shaft H, and frame A, the whole so arranged that while the draft is applied centrally of the harrow the latter is prevented from overturning, substantially as herein set forth.

In witness whereof I have hereunto signed my name in the presence of two subscribing witnesses.

GEORGE W. WARREN.

Witnesses:
O. TOUSEY,
EDWIN PORTER.